United States Patent [19]

Kawabuchi

[11] Patent Number: 4,677,853
[45] Date of Patent: Jul. 7, 1987

[54] ULTRASONIC PROBE

[75] Inventor: Masami Kawabuchi, Yokohama, Japan

[73] Assignee: Matsushita Electric Industrial Co., Ltd., Osaka, Japan

[21] Appl. No.: 854,784

[22] Filed: Apr. 23, 1986

[30] Foreign Application Priority Data

Apr. 26, 1985 [JP] Japan .................................. 60-90021

[51] Int. Cl.⁴ ............................................. G01N 29/00
[52] U.S. Cl. ........................................ 73/644; 128/660
[58] Field of Search .......................... 73/644, 625, 628; 128/660, 661, 662, 663

[56] References Cited

U.S. PATENT DOCUMENTS 4,097,835  6/1978  Green ................................. 340/1 R

FOREIGN PATENT DOCUMENTS 0174167  8/1985  European Pat. Off. .
2329386 12/1973  Fed. Rep. of Germany ......... 73/625
3008553  9/1980  Fed. Rep. of Germany ...... 128/660
3045623 12/1980  Fed. Rep. of Germany .

Primary Examiner—Jerry W. Myracle
Attorney, Agent, or Firm—Stevens, Davis, Miller & Mosher

[57] ABSTRACT

An ultrasonic probe for use in an ultrasonic diagnosis device is disclosed. The ultrasonic probe of this invention comprises an oscillator unit having: a first rotatable composite oscillator which includes oscillators having inherent center frequencies different from each other, the oscillators being disposed back-to-back; and a second rotatable, frame-shaped composite oscillator which is disposed around the first composite oscillator and includes oscillators having inherent center frequencies different from each other, the oscillators being disposed back-to-back. The rotating shafts of the first and second composite oscillators are disposed concentrically in such a manner as to be freely brought into and out of mutual engagement. The oscillator unit is disposed together with an acoustic propagation liquid within an acoustic window, and circuitry for driving and controlling the respective oscillators or the oscillator unit are disposed within the box of the ultrasonic probe.

19 Claims, 5 Drawing Figures

ULTRASONIC PROBE

BACKGROUND OF THE INVENTION

1. Field of the Invention

The present invention relates to an ultrasonic probe which is used in an ultrasonic diagnostic apparatus which is arranged to transmit and receive ultrasonic waves into and from an organ for the purpose of obtaining information required for a medical diagnosis, and more particularly, to an ultrasonic probe which enables high-speed sector scanning of an ultrasonic beam by a mechanical means.

2. Description of the Prior Art

Mechanical sector-scanning ultrasonic probes (hereinafter referred to as "MSPs") have heretofore been widely used and are capable of providing high-quality sectoral ultrasonic tomograms (hereinafter referred to as "B-mode information") at a relatively low cost. However, from the clinical viewpoint, a strong demand exists for a diagnosis with simultaneous reference to B-mode information and also M-mode or Doppler mode information. However, prior-art MSPs have been limited in terms of their construction or operating principles.

In order to meet this demand, a certain type of MSP has recently been proposed which comprises a construction such as that disclosed in the specification of Japanese Utility Model Unexamined Publication No. 66144/1984. This conventional type of MSP will be described below with reference to FIGS. 1(a) and 1(B). In FIGS. 1(A) and 1(B), reference numeral 101 denotes a B-mode oscillator, reference numeral 102 a frame-shaped M-mode oscillator which is disposed around the B-mode oscillator 101, reference numeral 103 a rotating shaft of the B-mode oscillator 101, and reference numeral 104 a rotating shaft of the M-mode oscillator 102.

According to this arrangement, the B-mode oscillator 101 is rotated at high speed to thereby obtain B-mode information within a predetermined angular range. Simultaneously, the M-mode oscillator 102 is rotated in a desired direction by manual or electrical operations so as to obtain M-mode information. The center frequency inherent in the B-mode oscillator 101 is set so as to differ from that inherent in the M-mode oscillator 102. Therefore, even if the B-mode oscillator 101 and the M-mode oscillator 102 are actuated at the same time, neither of the oscillators can exert any influence on the information obtained by the other.

However, the above-described construction upon which the prior art relies involves the following disadvantages.

In general, if B-mode information and M-mode information are to be obtained simultaneously, M-mode information is considered to be the primary item in terms of clinical applications, while B-mode information is used as an auxiliary item for facilitating detection of a portion covered by M-mode information. Nevertheless, in terms of the configuration of the M-mode oscillator 102, the ultrasonic beams transmitted and received by the oscillator 102 have abnormally high side-lobe levels, when compared with those transmitted and received by the B-mode oscillator 101. It is said that such side-lobe levels result in one of the causes which give rise to "artifacts" causing an erroneous diagnosis. As will be evident from the above description, it is not advisable to use the oscillator 101 for the collection of B-mode information while using the oscillator 102 for the collection of the M-mode information. As mentioned above, the center frequencies inherent in the oscillators 101 and 102 are set so as to differ from each other. Hence, if either one of high-quality B-mode information and M-mode information is to be obtained at a frequency suitable for a diagnosis, another MSP is needed. This is disadvantageous from the viewpoint of economy and clinical application.

SUMMARY OF THE INVENTION

Object of the Invention

Accordingly, it is an object of the present invention to provide an ultrasonic probe of the mechanical sector-scanning type which is capable of simultaneously obtaining high-quality M-mode and B-mode information, and in addition, enables the selection of a desired frequency suitable for a certain clinical application.

It is another object of the present invention to provide an ultrasonic probe of the mechanical sector-scanning type which enables a single operation in the B mode, the M mode, the pulse-doppler mode or the continuous-doppler mode, as well as simultaneous operations in the B mode and the M mode or the pulse-doppler mode, thereby making it possible to consistently obtain optimal information.

BRIEF SUMMARY OF THE INVENTION

To these ends, the technical means of this invention comprises a first rotatable composite oscillator including: oscillators which have inherent center frequencies different from each other, each of the oscillators being disposed back-to-back; and a second rotatable, frame-shaped composite oscillator which is disposed around the first composite oscillator and includes oscillators which have inherent center frequencies different from each other, each of the oscillators being disposed back-to-back.

The above and other objects, features and advantages of the present invention will become apparent from the following description of the preferred embodiment thereof, taken in conjunction with the accompanying drawings.

DESCRIPTION OF THE PREFERRED EMBODIMENT

Description will be made of one preferred embodiment with reference to the accompanying drawings.

Figure 2A:
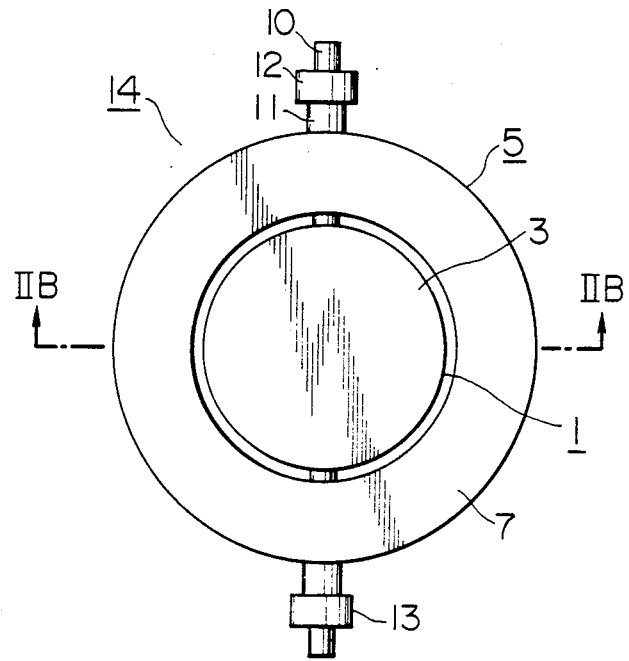
FIG. 2A is a plan view of an oscillator unit incorporated in one embodiment of the ultrasonic probe of a mechanical sector-scanning type of this invention.
Figure 2B:
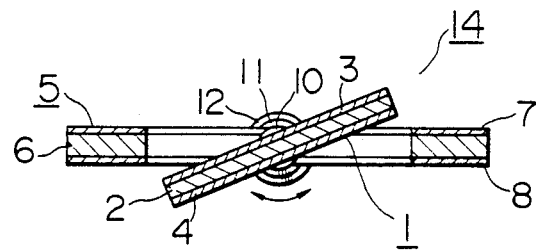
FIG. 2B is a sectional view taken along the line Ib—Ib of FIG. 2A.

FIG. 2A is a plan view of an oscillator unit 14 incorporated in one embodiment of the ultrasonic probe of this invention, and FIG. 2B is a sectional view taken along the line Ib—Ib of FIG. 2A. In FIGS. 2A and 2B, a first disc-shaped composite oscillator 1 is constituted by oscillators 3 and 4 disposed back-to-back, with a substrate 2 interposed therebetween. The oscillators 3 and 4 have inherent center frequencies $f_1$ and $f_2$ which are different from each other. A second frame-shaped composite oscillator 5 is disposed around the first composite oscillator 1, and is constituted by oscillators 7 and 8 being disposed back-to-back, with a substrate 6 interposed therebetween. The oscillators 7 and 8 also have inherent center frequencies $f_1$ and $f_2$ which are different from each other. The respective oscillators 3, 4, 7, and 8 are constituted by piezoelectric ceramics, an acoustic matching layer, an acoustic lens, a back load material and so forth, and the inherent center frequencies $f_1$ and $f_2$ are separated to the extent that, even if both members of each pair of oscillators 3 and 4 or 7 and 8 are actuated at the same time, no problems such as acoustic-wave interference may occur in practical terms. In this embodiment, $f_1 = 3$ MHz and $f_2 = 5$ MHz. A rotating shaft 10 of the first composite oscillator 1 is passed into the second composite oscillator 5. A rotating shaft 11 of the second composite oscillator 5 is concentrically fitted onto the periphery of the rotating shaft 10. This arrangement allows the first and second composite oscillators 1 and 5 to be relatively rotated about the rotating shafts 10 and 11, respectively, and the oscillators 3 and 4 or 7 and 8 are adapted to be situated in the same plane. A coupling device 12 is constituted by an electromagnetic clutch or the like which brings the rotating shafts 10 and 11 into or out of mutual engagement, and a signal transfer unit 13, which is constituted by a slip ring, a rotary transformer or the like, delivers transmitting and receiving signals to the oscillators 3, 4, 7, and 8.

Figure 1A:
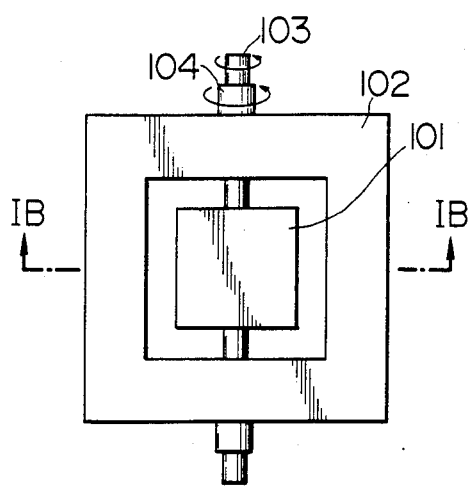
FIG. 1A is a plan view of an oscillator unit incorporated in the prior-art ultrasonic probe of a mechanical sector-scanning type.
Figure 1B:
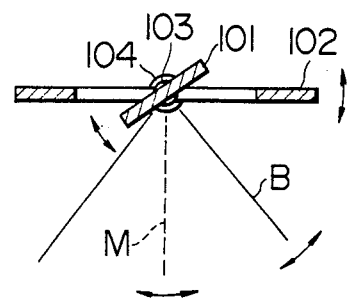
FIG. 1B is a sectional view taken along the line IIIb—IIIb of FIG. 1A.
Figure 3:
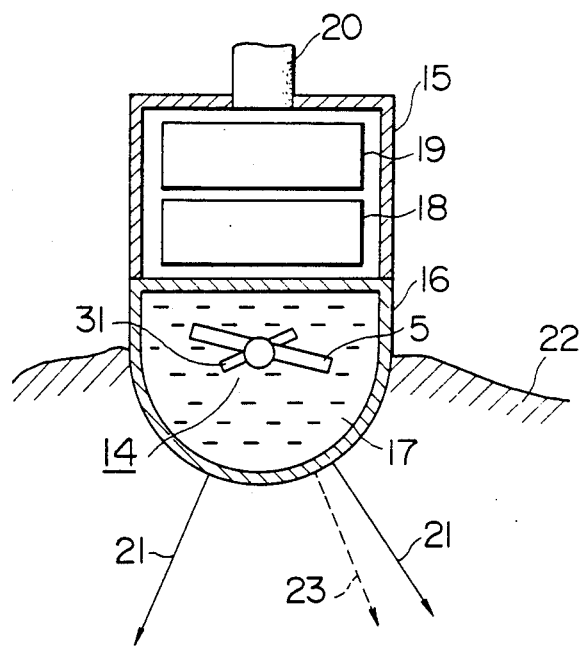
FIG. 3 is a schematic illustration of the entire construction of one embodiment of the ultrasonic probe of a mechanical sector-scanning type in accordance with the present invention.

FIG. 3 is a schematic illustration showing the entire MSP incorporating the oscillator unit 14 referred to in the above description of FIGS. 2A and 2B. A box 15 is provided at its front surface with an acoustic window 16 constituted by a plastic such as polymethyl pentene having excellent transmittivity, and the above-mentioned oscillator unit 14 is incorporated in the interior of the acoustic window 16. Reference numeral 17 denotes an acoustic-wave propagation liquid which is charged in the interior of the acoustic window 16, reference numeral 18 a drive section which causes the rotation of the oscillator unit 14, reference numeral 19 a control section which controls the rotational motion of the first and second composite oscillators 1 and 5 and the actuation of the coupling device 12, and reference numeral 20 a cable which connects the MSP with an ultrasonic diagnosis apparatus (not shown).

The operation of the above embodiment will be described below.

When B-mode information and M-mode information are to be obtained at the same time, the oscillator 8 which is disposed on the second composite oscillator 5 and has the inherent center frequency $f_2$ is used in the B mode, while in the M mode the oscillator 3 which is disposed on the first composite oscillator and has the inherent center frequency $f_1$ is used. The coupling device 12 is brought into disengagement, and the motor incorporated in the drive section 18 causes the high-speed oscillation of the second composite oscillator 5. Thus, ultrasonic beams 21 are transmitted into and received from a subject to be examined and a real-time tomogram is thereby obtained. In the meantime, the first composite oscillator 1 is turned by manual or electrical operations and fixed at a predetermined angular position at which M-mode ultrasonic beams 23 are transmitted and received so as to obtain M-mode information. In order to make the frequencies of the B mode and the M mode different from each other, both members of each pair of the oscillators 3 and 8 or 4 and 7 are appropriately combined as required. Specifically, the first composite oscillator 1 and the second oscillator 5 are rotated 180 degrees by using the drive section 18 and the control section 19.

A combination of the center frequencies $f_1$ and $f_2$ with respect to the B and M modes can quickly be selected as desired by taking account of penetration, resolution, the particular portion to be examined and the like. This ability is significant in terms of clinical applications.

If B-mode information and pulse-doppler information are to be obtained simultaneously, the oscillator used in the M mode is employed in the pulse-doppler mode and is actuated in a manner similar to the aforementioned case where B-mode information and M-mode information are obtained at the same time.

If any single item of information in the B mode, the M mode, the pulse-doppler mode, and the continuous-wave-doppler mode is to be obtained in a separate form, the oscillators having inherent center frequencies, for example, the oscillators 3 and 7 or 4 and 8 are positioned in the same plane by using the drive section 18 and the control section 19. In this state, the coupling device 12 is so operated as to couple the rotating shafts 10 and 11 of the respective oscillators 1 and 5, thereby actuating the oscillators in a state equivalent to a single unit. If B-mode information alone is to be obtained, the thus-coupled oscillators are oscillated at high speed, and if any item of information in the M mode, the pulse-doppler mode and the continuous-wave-doppler mode is to be obtained, the coupled oscillators are turned in a predetermined direction by means of the drive section 18 and the control section 19, thereby obtaining the information corresponding to each mode. In the case of the continuous-wave-doppler mode, the first composite oscillator 1 is adapted for a transmission operation and the second composite oscillator 5 is adapted for a reception operation. In addition, this embodiment of the present invention possesses advantage in that it is possible to quickly effect changeover between the above-described operation for separately extracting a single item of information in each mode and the previously-described operation for simultaneously obtaining B-mode information and M-mode or pulse-doppler mode information. Moreover, since the embodiment of this invention is capable of operating at two different frequencies, the embodiment is characterized by its high performance and a variety of information which can be obtained.

As will be understood from the above disclosure, the ultrasonic probe of this invention is arranged in such a manner that the first composite oscillator includes oscillators having inherent center frequencies which are different from each other, each oscillator being disposed back-to-back, and the second composite oscillator is disposed around the first oscillator, the respective first and second oscillators being capable of moving pivotally. Therefore, it is possible to obtain real-time B-mode information while obtaining high-quality M-mode information or pulse-doppler information. It is a matter of course that any single item of information in the B mode, the M mode, the pulse-doppler mode, and the continuous-wave-doppler mode can selectively be obtained, and also, the B mode and the M mode or the B mode and the pulse-doppler mode can be freely combined, thereby enabling a variety of operating modes. Furthermore, changeover between these operating modes or combinations can be effected in a short time, and desired modes can be selected simultaneously in correspondence with two different frequencies, whereby it is possible to obtain information suitable for a diagnosis.

While the above provides a full and complete disclosure of the invention, various modifications, alternate constructions and equivalents may be employed without departing from the true spirit and scope of the invention. Therefore, the above description and illustrations should not be construed as limiting the scope of the invention, which is defined by the appended claims.

What is claimed is:

1. An ultrasonic probe comprising:
   a first rotatable composite oscillator which includes first and second oscillators having inherent center frequencies different from each other, said first and second oscillators being disposed back-to-back; and
   a second rotatable, frame-shaped composite oscillator which is disposed around said first composite oscillator and includes third and fourth oscillators having inherent center frequencies different from each other, said third and fourth oscillators being disposed back-to-back.

2. An ultrasonic probe according to claim 1, wherein the center frequency inherent in said first composite oscillator is equal to that inherent in said second composite oscillator.

3. An ultrasonic probe according to claim 1, wherein said first composite oscillator and said second composite oscillator are relatively rotatable, one of said first and second composite oscillators being rotated at high speed.

4. An ultrasonic probe according to claim 1, wherein said first composite oscillator and said second composite oscillator are coupled in such a manner as to be capable of rotating as a single unit.

5. An ultrasonic probe according to claim 1, wherein the rotating shafts of said first and second composite oscillators are concentrically disposed.

6. An ultrasonic probe according to claim 5, wherein one of the first and second oscillators contained in said first composite oscillator has an inherent center frequency identical to one of the third and fourth oscillators contained in said second composite oscillator, said oscillators having identical frequencies being disposed in an identical plane, thereby enabling said B mode, said M mode and said continuous-wave-doppler mode.

7. An ultrasonic probe according to claim 1, wherein said first composite oscillator is used in an M mode or a pulse-doppler mode and said second composite oscillator is used in a B mode, said first and second composite oscillators being actuated at the same time.

8. An ultrasonic probe comprising:
   a first rotatable composite oscillator which includes first and second oscillators having inherent center frequencies different from each other, said first and second oscillators being disposed back-to-back;
   a second rotatable, frame-shaped composite oscillator which is disposed around said first composite oscillator and includes third and fourth oscillators having inherent center frequencies different from each other, said third and fourth oscillators being disposed back-to-back;
   the rotating shafts of said first and second composite oscillators being disposed concentrically; and
   said rotating shafts being freely brought into and out of engagement with each other.

9. An ultrasonic probe according to claim 8, wherein the center frequency inherent in said first composite oscillator is equal to that inherent in said second composite oscillator.

10. An ultrasonic probe according to claim 8, wherein said first composite oscillator and said second composite oscillator are relatively rotatable, one of said first and second composite oscillators being rotated at high speed.

11. An ultrasonic probe according to claim 8, wherein said first composite oscillator and said second composite oscillator are coupled in such a manner as to be capable of rotating as a single unit.

12. An ultrasonic probe according to claim 8, wherein said first composite oscillator is used in an M mode or a pulse-doppler mode and said second composite oscillator is used in a B mode, said first and second composite oscillators being actuated at the same time.

13. An ultrasonic probe according to claim 8, wherein one of the first and second oscillators contained in said first composite oscillator has an inherent center frequency identical to one of the third and fourth oscillators contained in said second composite oscillator, said oscillators having identical frequencies being disposed in an identical plane, thereby enabling said B mode, said M mode and said continuous-wave-doppler mode.

14. An ultrasonic probe comprising an oscillator unit having:
   a first rotatable composite oscillator which includes first and second oscillators having inherent center frequencies different from each other, said first and second oscillators being disposed back-to-back;
   a second rotatable, frame-shaped composite oscillator which is disposed around said first composite oscillator and includes third and fourth oscillators having inherent center frequencies different from each other, said third and fourth oscillators being disposed back-to-back;
   the rotating shafts of said first and second composite oscillators being disposed concentrically;
   said rotating shafts being freely brought into and out of engagement with each other;
   said oscillator unit being disposed together with an acoustic propagation liquid within an acoustic window; and
   means for driving and controlling at least one of said respective oscillators and said oscillator unit, said driving means being disposed within a housing.

15. An ultrasonic probe according to claim 14, wherein the center frequency inherent in said first composite oscillator is equal to that inherent in said second composite oscillator.

16. An ultrasonic probe according to claim 14, wherein said first composite oscillator and said second composite oscillator are relatively rotatable, one of said first and second composite oscillators being rotated at high speed.

17. An ultrasonic probe according to claim 14, wherein said first composite oscillator and said second composite oscillator are coupled in such a manner as to be capable of rotating as a single unit.

18. An ultrasonic probe according to claim 14, wherein said first composite oscillator is used in a M mode or a pulse-doppler mode and said second composite oscillator is used in a B mode, said two oscillators being actuated at the same time.

19. An ultrasonic probe according to claim 14, wherein one of the first and second oscillators contained in said first composite oscillator has an inherent center frequency identical to one of the third and fourth oscillators contained in said second composite oscillator, said oscillators having identical frequencies being disposed in an identical plane, thereby enabling said B mode, said M mode and said continuous-wave-doppler mode.

* * * * *